G. M. EATON.
ARTICULATED LOCOMOTIVE.
APPLICATION FILED APR. 12, 1909.
1,036,811.
Patented Aug. 27, 1912.
6 SHEETS—SHEET 2.
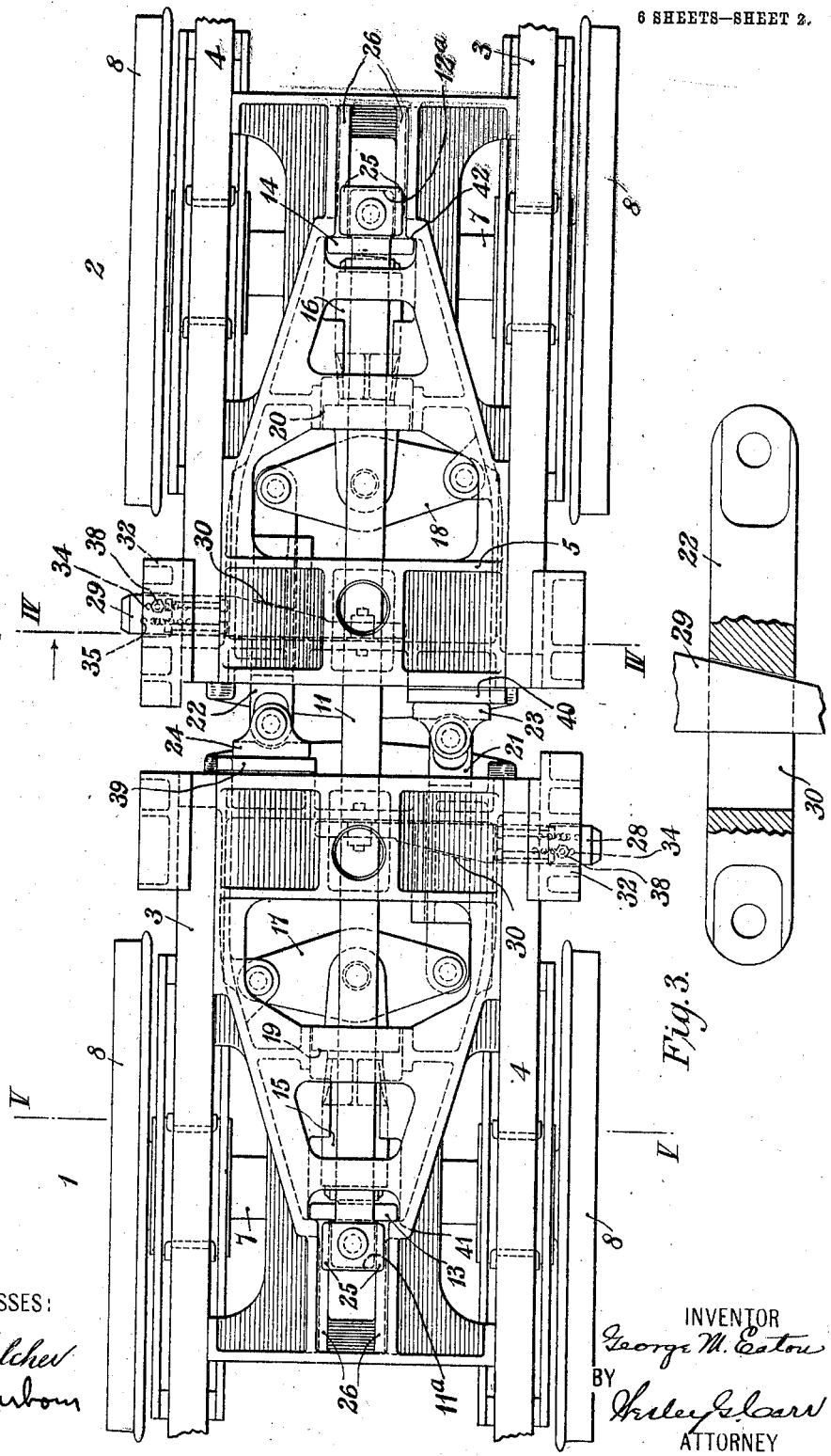
WITNESSES:
C. L. Belcher
R. J. Dearborn
INVENTOR
George M. Eaton
BY
Wiley G. Carr
ATTORNEY

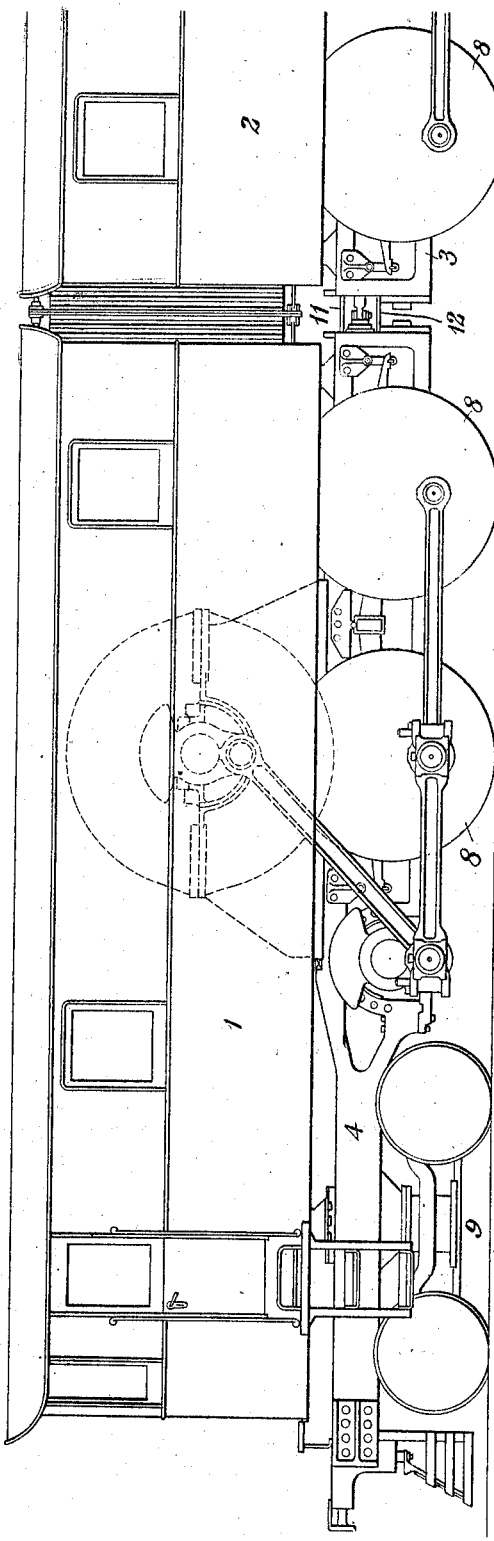

G. M. EATON.
ARTICULATED LOCOMOTIVE.
APPLICATION FILED APR. 12, 1909.

1,036,811.

Patented Aug. 27, 1912.

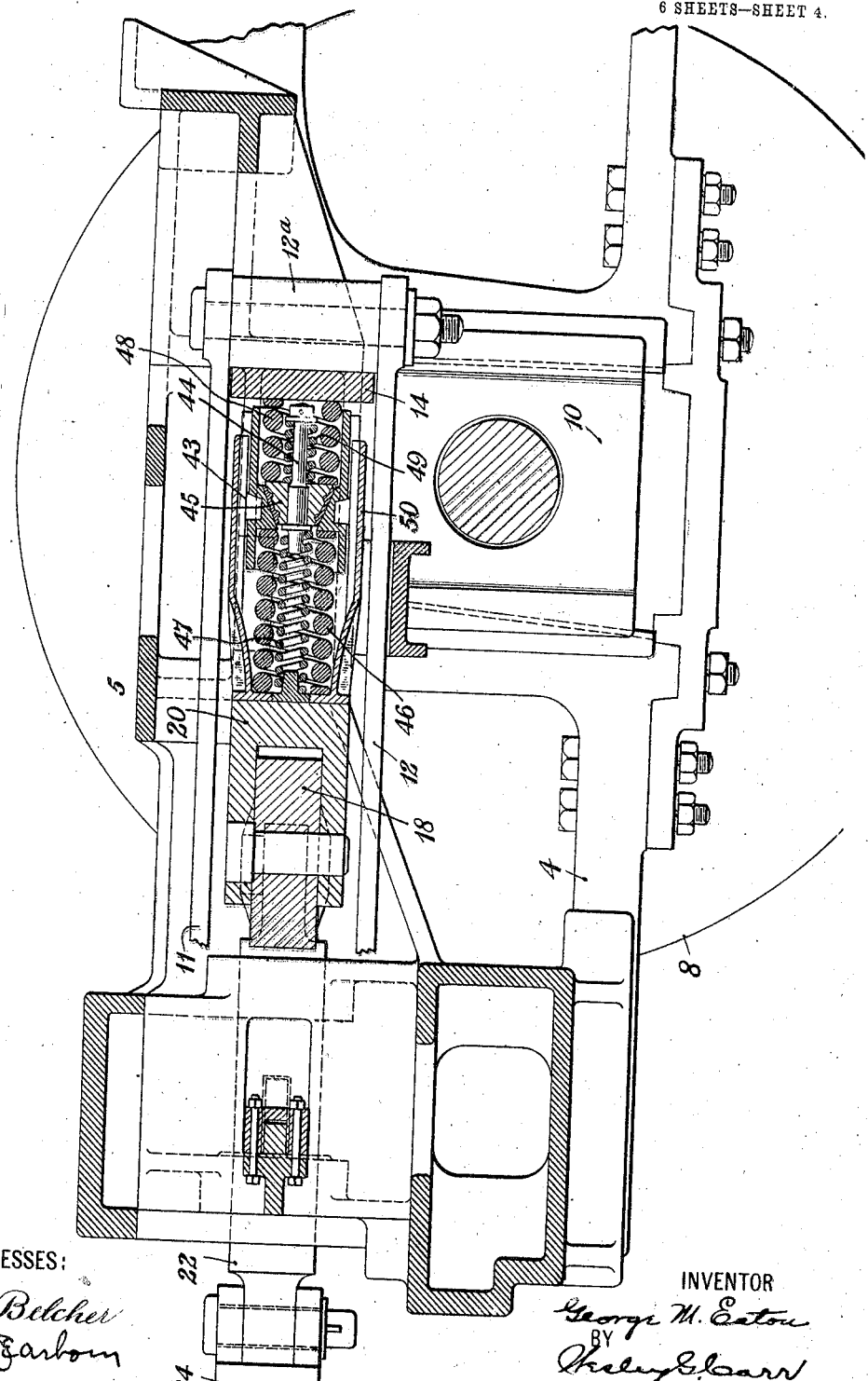

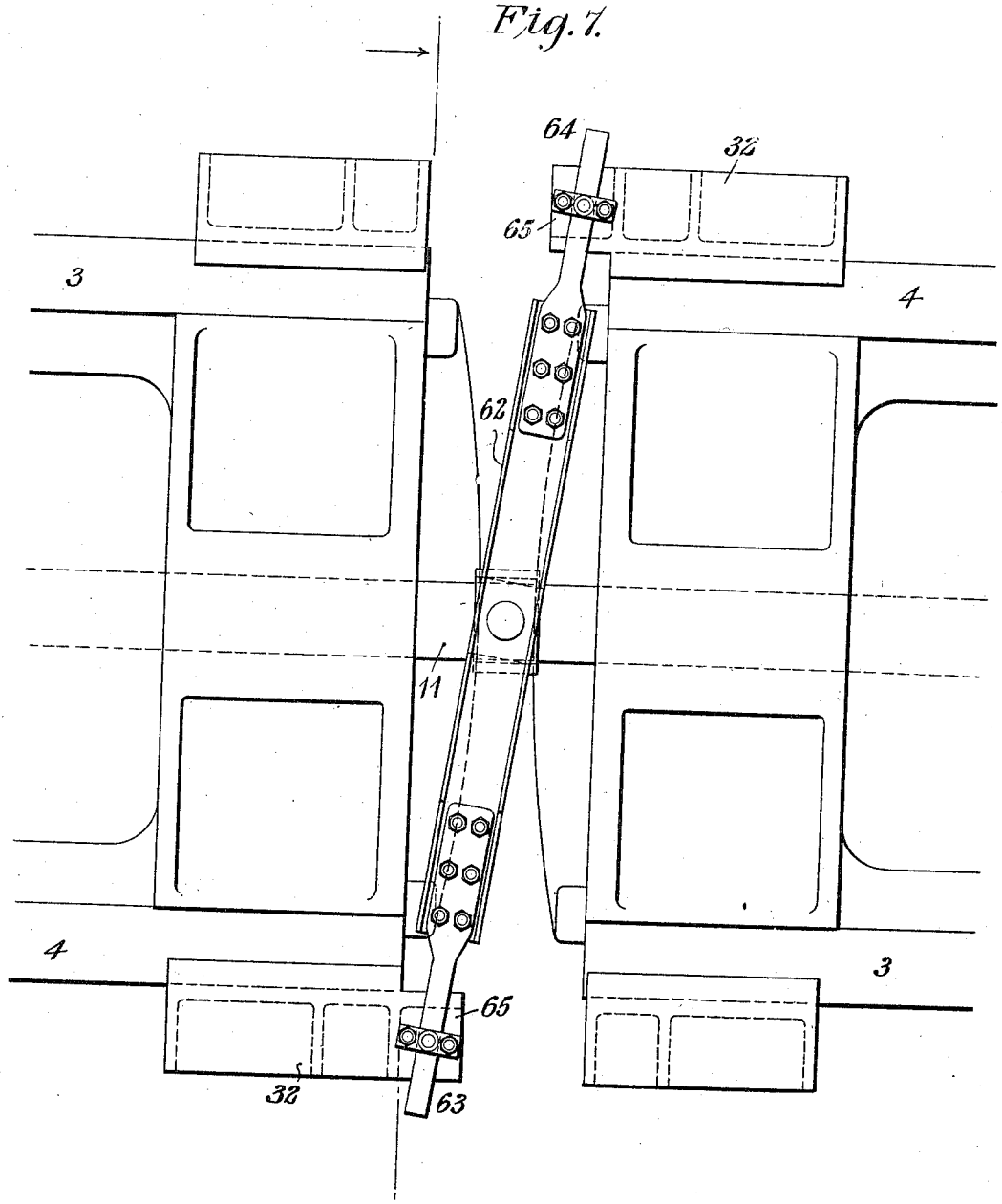

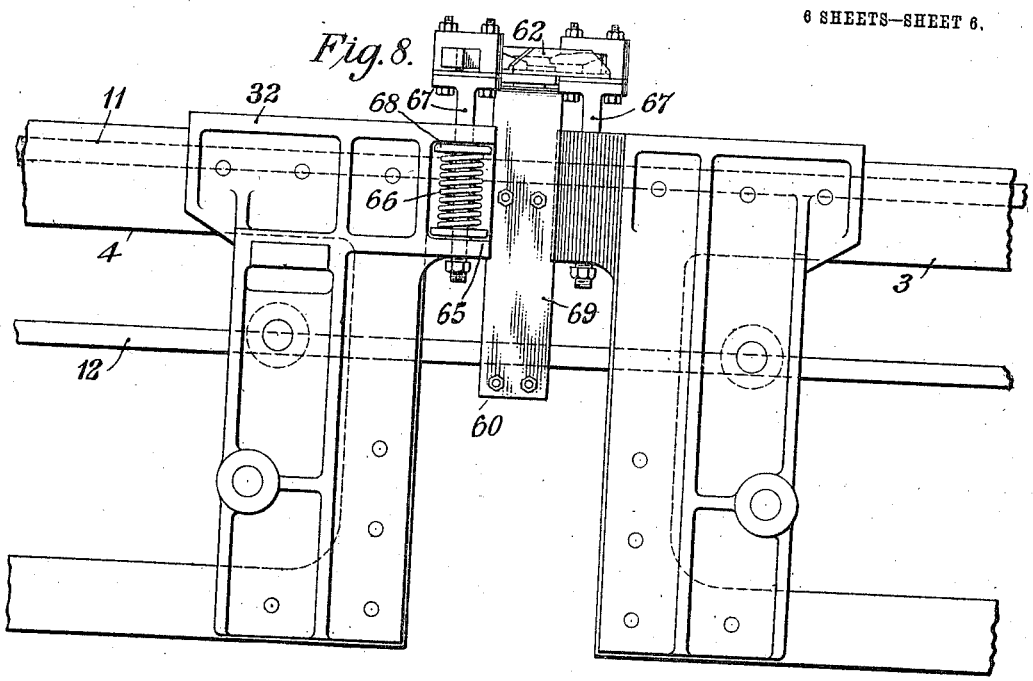
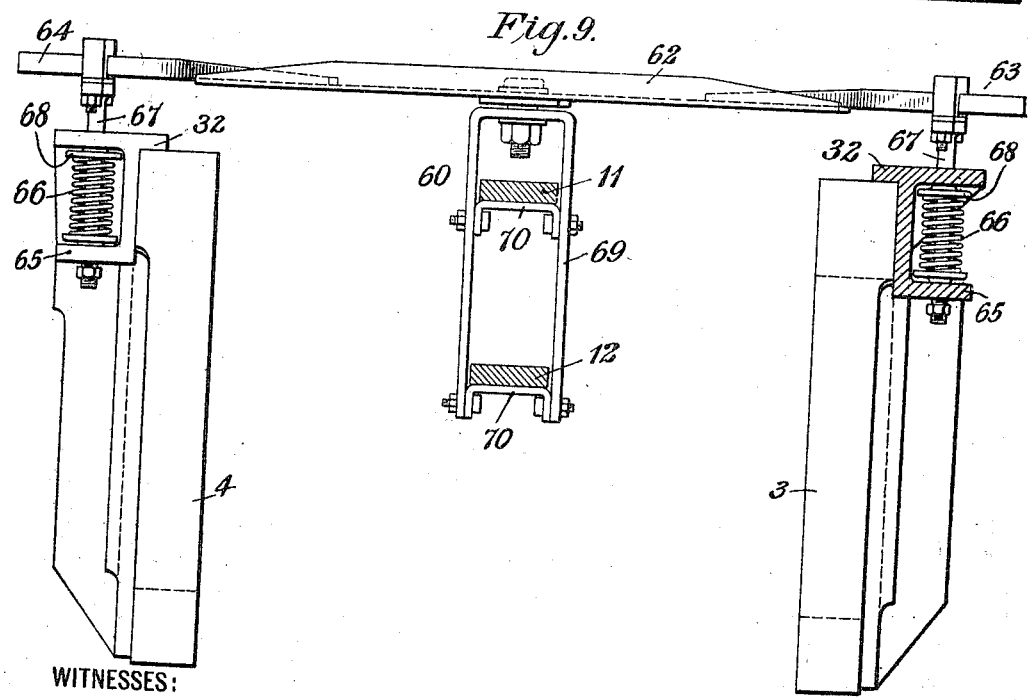

UNITED STATES PATENT OFFICE.

GEORGE M. EATON, OF WILKINSBURG, PENNSYLVANIA, ASSIGNOR TO WESTINGHOUSE ELECTRIC AND MANUFACTURING COMPANY, A CORPORATION OF PENNSYLVANIA.

ARTICULATED LOCOMOTIVE.

1,036,811.     Specification of Letters Patent.     Patented Aug. 27, 1912.

Application filed April 12, 1909. Serial No. 489,252.

*To all whom it may concern:*

Be it known that I, GEORGE M. EATON, a citizen of the United States, and a resident of Wilkinsburg, in the county of Allegheny and State of Pennsylvania, have invented a new and useful Improvement in Articulated Locomotives, of which the following is a specification.

My invention relates to railway vehicles, and it has special reference to locomotives which are composed of two articulated half units and are provided with electrical propelling motors.

Electric locomotives of large capacity have heretofore been composed of two articulated half units in order to reduce the rigid wheel base of the locomotive and to permit of the replacement of a disabled half unit by an operative member, thereby reducing idle equipment to a minimum.

The object of my invention is to provide simple and effective means for so coupling the half units of an articulated locomotive that the leading half unit shall act as a leading truck for the trailing half unit in either direction of operation.

Another object of my invention is to oppose the tendency for a so-called "nosing" action to take place between the half units. This "nosing" action may be such that the joined ends of the half units will move laterally across the center of the track, either together or in opposition. Coupling devices ordinarily used for vehicles may be entirely inadequate for the articulation of locomotive half units each of which is provided with a relatively short rigid wheel base and a swivel truck at its free end, since the leading half unit, as a whole, does not lead the trailing half unit in such a way as to reduce driver flange wear to a minimum.

According to my present invention, I provide a coupling which embodies a well known type of friction draft gear and which is so arranged as to introduce friction tending to oppose the "nosing" actions referred to above. My coupling also provides such a reaction between the two half units of the locomotive that the forward section is enabled to lead the entire locomotive in much the same way that the forward swivel truck of an American type locomotive leads the entire vehicle.

Figure 4:
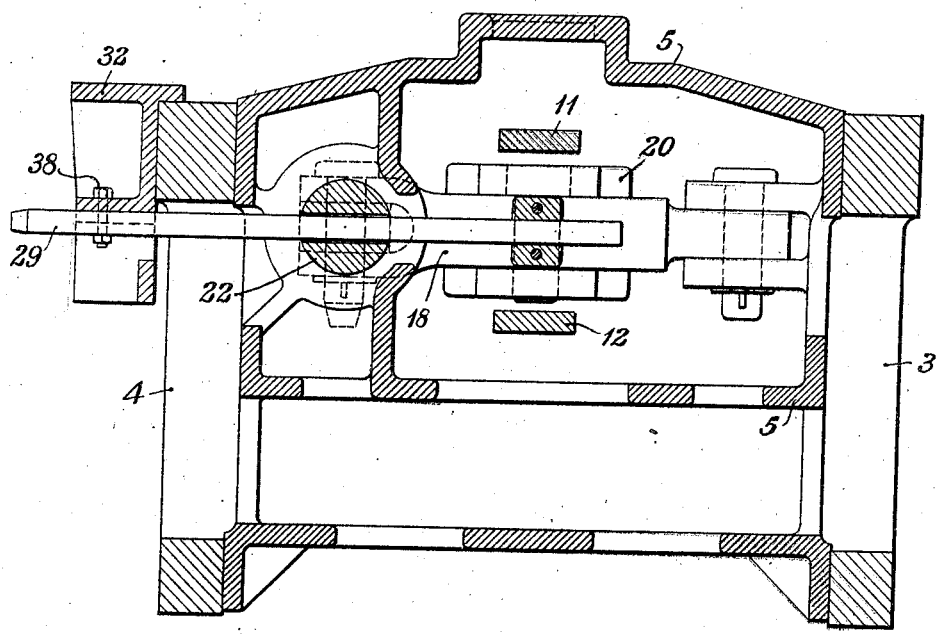
Figure 5:
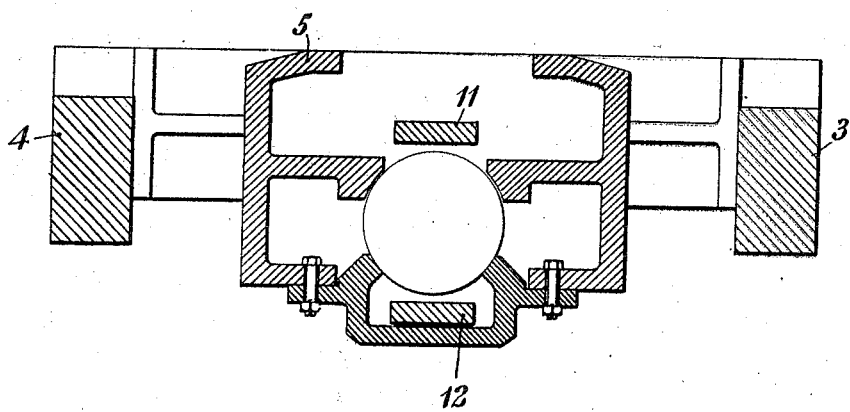

Figure 1 of the accompanying drawings is an elevation of a locomotive comprising articulated units constructed in general accordance with my invention. Fig. 2 is a partial plan view of the running gear of the device shown in Fig. 1 which sets forth the articulation or coupling mechanism. Fig. 3 is a detail view of one of the parts of the mechanism. Fig. 4 is a transverse section on line IV—IV of Fig. 2. Fig. 5 is a similar view on the line V—V of Fig. 2, and Fig. 6 is a longitudinal section of a portion of the structure shown in Fig. 2, and Figs. 7, 8 and 9 are, respectively, a plan view and elevations at right angles to each other of a stirrup or support with which the draw bars of Fig. 2 are provided.

Referring to the drawings, the locomotive here shown comprises two half units 1 and 2, which are substantially identical in every particular. Each of the sections comprises side frames 3 and 4, an articulation girder 5 and a plurality of cross-ties 6, driving axles 7 to which drivers 8 are secured and a four-wheel swivel truck 9. The driving axles are held in journal boxes 10 that are supported in the side frames 3. The swivel truck 9 is secured to the body bolster in the usual manner.

The articulation girder 5 is specially constructed to receive the parts of the coupling or articulation mechanism, as shown in Fig. 2 of the drawings. The articulation mechanism comprises a pair of parallel draw bars 11 and 12, which are pivotally secured, at their respective ends, to heads or spreaders 11$^a$ and 12$^a$ which, in turn, bear upon followers 13 and 14, friction draft gears 15 and 16 located one on each half unit of the locomotive, levers 17 and 18, which are pivotally secured to the articulation girders 5, followers 19 and 20 which are pivotally connected to intermediate points in the levers 17 and 18, plungers or sliding links 21 and 22 that are adjustably mounted in cylindrical bearings in the articulation girders and friction heads 23 and 24 which are pivotally secured to the outer ends of the plungers 21 and 22.

The draw bars 11 and 12 are relatively long so that their points of attachment lie within the rigid wheel base of the locomotive half units. The ends of the draw bars are provided with lateral extensions 25 to engage guide-ways 26 which are provided in the articulation girders, to carry the weight of the ends of the draw bars.

The levers 17 and 18 are disposed transversely of the locomotive half units, between the draw bars 11 and 12, and their ends are pivotally connected to the plungers 21 and 22. The friction draft gears 15 and 16 are interposed, respectively, between the followers 13 and 19, and 14 and 20, and their operation is limited, in one direction, by means of wedges 28 and 29 which are bolted, at their outer ends, to slotted castings 32 which are in turn bolted to the side frames 3 and 4. The wedges 28 and 29 are supported, at their inner ends, by guide blocks 33. Each of the wedges is provided with two sets of holes 34 and 35 which are relatively staggered so that an adjustment of the wedge may be effected by changing a bolt 38 from a hole in one set to a corresponding hole in the other set. As indicated in Figs. 2 and 3, the end of the slot 30 which is adjacent to the taper edge of the wedge is cut to register so that the wedge limits the outward movement of the plunger with which it is associated.

The method of coupling the two half units with initial tension on long draw bars is as follows: All parts in each half unit are assembled loosely in position, except long draw bars 11 and 12, and wedges 28 and 29. The wedges 28 and 29 are then entered and are driven hard home, compressing the friction draft gears 15 and 16 to a greater extent than the maximum desired initial compression. The long draw bars 11 and 12 are then entered into one half unit and pinned to the spreader 11ª. The two half units are then brought together and the long draw bars pinned to the other spreader 12ª. The wedges 28 and 29 are then driven out sufficiently to leave the desired clearance of wedge in slot 30, and are held from further movement by bolts 38. The complete locomotive is then coupled in operative condition. The articulation mechanism as a whole is so constructed that a somewhat greater tension may preferably be placed upon the draft gears than is ordinarily utilized in railway vehicles.

When the various parts become worn so that the pressure initially applied to the draft gear is reduced beyond the required minimum, a new wearing plate 39 or 40, or a new wearing head 23 or 24 will be applied. Wedges 28 and 29 will be used in making application and readjustment, as outlined above. Under pulling conditions the tension strains are borne entirely by the draw bars 11 and 12.

The followers 13 and 14 extend horizontally beyond spreaders 11ª and 12ª. Under bumping conditions these followers will engage shoulders 41 and 42 on the articulation girders so that the frame of the locomotive receives the compression strains and no buckling can occur on long draw bars. The friction draft gears 15 and 16 are, of course, interposed, in both cases, to prevent the shocks which would otherwise come upon the rigid parts of the locomotive.

Referring to Figs. 7, 8 and 9 of the drawings, a stirrup 60 depends from a cross-beam 62 and serves to support and steady the draw bars 11 and 12, which are relatively long and might otherwise be distorted. The respective ends of the rod 62 are resiliently supported upon diagonally opposite corners 63 and 64 of the adjacent ends of the half units, the slotted castings 32, at the corners of the units referred to, being provided with projections 65 which extend beyond the ends of the frames and constitute pockets in which helical springs 66 are disposed, bolts or clamps 67 being secured to the ends of the rod 62 and extending through the springs from which they are supported by followers or spring blocks 68, in the usual manner.

Since one end of the cross-beam 62 is supported from one half-unit and the other end by the other half-unit, the stirrup tends to hold the draw bars in their proper position without danger of bending or distorting them even when the adjacent ends of the half units are considerably out of horizontal alinement. Furthermore, the helical springs form a yielding support for the extremities of the cross-beam, thereby permitting a considerable adjustment of the stirrup without allowing the draw bars to chatter at any time. The stirrup itself may be of any suitable form, comprising, as shown in the drawings, a U-shaped member 69 having a pair of cross strips 70 secured to its arms, upon which the draw bars rest.

The operation of the locomotive in service will now be described.

If it is first assumed that the locomotive is at rest on a straight track, there will be a certain amount of tension in the draw bars 11 and 12. This is due to the fact that the draft gears 15 and 16 are under initial compression. This tension on the draw bars will be equalized by a like amount of compression which is equally divided between the friction heads 23 and 24 which engage the friction plates 39 and 40. If the locomotive is starting a heavy train on a straight track, the tension on the draw bars 11 and 12 will be increased, the draw bar pull being transmitted to the locomotive structure through the friction draft gears which will be compressed. This will permit the half-units to be temporarily separated to a slight degree. The plungers 21 and 22 will be forced outwardly until they engage in slot 30 with wedges 28 and 29. The engagement between the friction surfaces will be lost under maximum starting draw bar pull, but the initial pressure of friction draft gear will be so adjusted that, at speeds where "nosing" might occur, the friction heads will, on account of reduced draw bar pull, engage heavily with the friction plates. The action is thus in a measure automatic, a greater frictional engagement existing as speed, and consequent possibility of "nosing", increases.

When the locomotive is rounding a curve, while all of the tension is still being borne by the draw bars 11 and 12, the compression strains will not be equally divided between the friction heads 23 and 24 but the one on the inside of the curve will be compressed to a greater extent than the one farther from the center. If the curve is sharp, the outer friction head may be separated entirely from the friction plate with which it is normally engaged, all of the compression being thrown upon the other friction head, under these circumstances. Since the friction heads are not located on the locomotive centerline, the compression forces referred to above will tend to maintain the two units in alinement and will be of material assistance in causing the forward half unit to lead the trailing half unit when the locomotive is rounding curves.

The fact that the friction heads tend to keep the two half units in alinement obviously assists in overcoming the "nosing" of the half units together and the friction between the heads and the plates serves to dampen any tendency of the half units to nose in opposition to each other.

The friction draft gear illustrated in Fig. 6 is of the well known Westinghouse type and comprises a plurality of friction strips 43, a release pin 44, a wedge 45, a release spring 46, an auxiliary release spring 47, an initial compression spring 48, an auxiliary initial compression spring 49 and a cylindrical body or casing 50 in which the parts are disposed.

The structure of the draft gear forms no part of my present invention and other suitable structures may be substituted for that illustrated, within the scope of my invention. While I believe the articulation mechanism shown in the drawings to be preferable, I do not desire to be limited to any specific arrangement, and I desire that modifications which do not depart from the spirit of my invention shall be included within its scope.

I claim as my invention:

1. In a railway vehicle, the combination with a pair of part units, of a coupling between said part units comprising a tension member, a compression member having laterally displaced parts, and friction gears interposed between said members.

2. In a railway vehicle, the combination with a pair of half units, of a coupling comprising a centrally disposed tension member, a compression member having laterally displaced parts, and interposed friction gears, said coupling serving to prevent "nosing" and to maintain said half units in alinement.

3. In a railway vehicle, the combination, with a pair of half units having driving wheels at their adjacent ends constituting a rigid wheel base for each half unit, of coupling means between half units comprising draw bars the ends of which are pivoted to the half units within the rigid wheel base of each of them, and reaction plungers at the sides of said draw bars.

4. In an articulated locomotive, the combination with two half units, of a coupling therefor comprising draw bars that offer no resistance to bumping, and reaction plungers at the sides of said draw bars.

5. In an articulated locomotive, the combination with two half units, of a coupling between the half units comprising centrally located draw bars which offer no resistance to bumping, and reaction plungers which tend to maintain the half units in alinement.

6. In an articulated locomotive, the combination with two half units, of a coupling therefor comprising friction draft gears, draw bars that act through the draft gears in one direction, and reaction plungers that oppose bumping and act through the draft gears in the opposite direction.

7. In an articulated locomotive, the combination with a pair of half units having driving wheels at their adjacent ends forming a rigid wheel base for each half unit, of coupling means between half units comprising draw bars which serve to tie the half units together through the draft gears, reaction plungers which oppose bumping between half units and means for transmitting the forces exerted upon the plungers to the adjacent ends of the draft gears.

8. In a railway vehicle, the combination with two half units having suitable body frames, of a coupling therefor comprising centrally located draw bars, a reaction plunger located at one side of each half unit, a cross lever fulcrumed on each body frame and pivotally secured to the inner end of the corresponding reaction plunger, and resilient spacing means having limited movements relative to the body frames and each disposed between one end of the draw bar and an intermediate point in the corresponding cross lever.

9. In a railway vehicle, the combination with two half units having suitable body frames, of a coupling therefor comprising a pair of centrally located draw bars, a reaction plunger located at one side of each half unit, a cross lever fulcrumed on each body frame and pivotally secured to the inner end of the corresponding reaction plunger, a pair of draw bars and friction draft gears each of which has a limited movement relative to one of the frames and is interposed between an intermediate point in the corresponding cross lever and adjacent ends of the draw bars.

10. In a railway vehicle, the combination with a pair of half units having driving wheels at their respective ends forming a rigid wheel base on each half unit, a reaction plunger located at one side of each half unit, a cross lever fulcrumed on the frame of each half unit, and pivotally secured to the inner end of the corresponding reaction plunger, a follower pivotally secured to an intermediate point in each cross lever, a pair of draw bars, a spreader pivotally secured to adjacent ends of the draw bars, a second follower coöperating with the spreader, a friction draft gear which is disposed between the two followers on each half unit and has a limited movement relative to the frame of said half unit.

11. In a railway vehicle, the combination with a pair of half units having driving wheels at their respective ends forming a rigid wheel base on each half unit, a reaction plunger located at one side of each half unit, a cross lever fulcrumed on the body frame of each half unit, and pivotally secured to the inner end of the corresponding reaction plunger, a follower pivotally secured to an intermediate point in each cross lever, a pair of draw bars, a spreader pivotally secured to adjacent ends of the draw bars, a second follower coöperating with the spreader, a friction draft gear which is disposed between the two followers on each half unit and has a limited movement relative to the body frame thereof, and means for adjusting the initial compression in each draft gear.

12. In a railway vehicle, the combination with a pair of half units having driving wheels at their respective ends forming a rigid wheel base on each half unit, a reaction plunger located at one side of each half unit, a cross lever fulcrumed on the body frame of each unit and pivotally secured to the inner end of the reaction plunger, a follower pivotally secured to an intermediatoe point in the corresponding cross lever, a pair of draw bars, a spreader pivotally secured to adjacent ends of the draw bars, a second follower coöperating with the spreader, a friction draft gear which is disposed between the two followers on each half unit and has a limited movement relative to the body frame thereof, and means for adjusting the initial compression in each draft gear comprising a wedge that extends through a slot in the corresponding reaction plunger to limit its movement in one direction, and means for adjusting the position of the wedge.

In testimony whereof, I have hereunto subscribed my name this 10th day of April 1909.

GEORGE M. EATON.

Witnesses:
R. J. DEARBORN,
B. B. HINES.